(12) United States Patent
Ogura

(10) Patent No.: US 8,900,358 B2
(45) Date of Patent: Dec. 2, 2014

(54) INK COMPOSITION FOR WATER-BASED BALLPOINT PEN

(71) Applicant: Kousuke Ogura, Kanagawa (JP)

(72) Inventor: Kousuke Ogura, Kanagawa (JP)

(73) Assignee: Mitsubishi Pencil Company, Limited, Tokyo (JP)

( * ) Notice: Subject to any disclaimer, the term of this patent is extended or adjusted under 35 U.S.C. 154(b) by 69 days.

(21) Appl. No.: 13/860,653

(22) Filed: Apr. 11, 2013

(65) Prior Publication Data

US 2013/0340649 A1    Dec. 26, 2013

(30) Foreign Application Priority Data

Apr. 13, 2012  (JP) .................. 2012-092281

(51) Int. Cl.
*C09D 11/18*   (2006.01)
(52) U.S. Cl.
CPC ..................................... *C09D 11/18* (2013.01)
USPC ...................................................... 106/31.25
(58) Field of Classification Search
CPC .............................. C09D 11/18; C09D 11/023
USPC ...................................................... 106/31.25
See application file for complete search history.

(56) References Cited

U.S. PATENT DOCUMENTS

| | | | |
|---|---|---|---|
| 2,652,410 A * | 9/1953 | Cunningham et al. | 554/121 |
| 4,671,691 A * | 6/1987 | Case et al. | 106/31.38 |
| 5,380,894 A * | 1/1995 | Burg et al. | 554/219 |
| 6,899,487 B2 * | 5/2005 | Fujii | 106/31.26 |

FOREIGN PATENT DOCUMENTS

| | | |
|---|---|---|
| JP | A-S62-501914 | 7/1987 |
| JP | A-2004-115611 | 4/2004 |
| JP | A-2004-115611 | 6/2004 |
| JP | 2005232340 A * | 9/2005 |
| JP | A-2007-327003 | 12/2007 |
| JP | A-2009-292872 | 12/2009 |
| JP | A-2010-275391 | 12/2010 |
| JP | A-2011-122031 | 6/2011 |

OTHER PUBLICATIONS

English translation of JP 2005/232340; Sep. 2005.*
English translation of JP 2009/292872; Dec. 2009.*

* cited by examiner

*Primary Examiner* — Helene Klemanski
(74) *Attorney, Agent, or Firm* — Andrew F. Young, Esq.; Lackenbach Siegel, LLP

(57) ABSTRACT

An object of the present invention is to provide an oil-in-water type emulsion ink composition for a water-based ballpoint pen, having improved storage stability, which does not cause phase separation even when stored at high or low temperature over the long period. Disclosed is an ink composition for a water-based ballpoint pen, comprising an aqueous phase, and an oil phase contained in the aqueous phase in a state of an oil-in-water type emulsion, wherein at least one of the oil phase and the aqueous phase comprises a colorant, and the oil phase comprises, in components composing the oil phase, an estolide which is a fatty acid oligomer in which fatty acids having a hydroxyl group are mutually condensed or a fatty acid having a hydroxyl group is condensed with a fatty acid having no hydroxyl group, or comprises an ester of the estolide and an alcohol.

4 Claims, No Drawings

INK COMPOSITION FOR WATER-BASED BALLPOINT PEN

CROSS REFERENCE TO RELATED APPLICATIONS

This application relates to and claims priority from JP Ser. No. 2012-092281 filed Apr. 13, 2012, the entire contents of which are incorporated herein by reference.

FIGURES SELECTED FOR PUBLICATION

None

BACKGROUND OF THE INVENTION

1. Field of the Invention

The present invention relates to an ink composition for a water-based ballpoint pen, and specifically to an ink composition for a water-based ballpoint pen in which an oil phase is contained in an aqueous phase in a state of an oil-in-water type emulsion.

2. Description of the Related Art

A ballpoint pen is roughly classified into two types: a water-based ballpoint pen using a water-based ink and an oil-based ballpoint pen using an oil-based ink. Since the water-based ink commonly has low viscosity, a large amount of the ink flows out of the water-based ballpoint pen during writing, and a clear drawn line is obtained, and thus splitting, starving, and a blobbing phenomenon are less likely to occur. The water-based ballpoint pen also writes smoothly because of low viscosity of the ink. However, on the other hand, the water-based ballpoint pen also has a drawback that a drawn line is likely to be feathered and writing unsmoothness is recognized during writing because of a large flow-out amount. To the contrary, the oil-based ballpoint pen causes no feathering of a drawn line and also exhibits less writing unsmoothness during writing because of high ink viscosity compared with the water-based ballpoint pen. However, because of a small flow-out amount during writing and high viscosity, the water-based ballpoint pen does not often write smoothly, and also often causes splitting or starving as well as a "blobbing" phenomenon due to an untransferred ink.

JP 62-501914 W discloses a gel ink ballpoint pen, in which feathering of a drawn line is reduced by imparting thixotropic nature to a water-based ballpoint pen ink, is developed so as to solve the above drawbacks of the water-based ballpoint pen. Although feathering of drawn line has been improved in a current gel ink ballpoint pen, writing unsmoothness has not yet sufficiently improved.

In recent days, there has also been developed an oil-based ballpoint pen in which feel of writing has been improved by decreasing viscosity of an oil-based ink. However, since the flow-out amount during writing increases in the oil-based ink having low viscosity, drawn line-drying property deteriorates, and thus causing strike-through of an ink to the rear surface of a paper, and blobbing.

JP 2004-115611 A discloses an oil-based ballpoint pen ink having low viscosity in which a W/O type organic solvent prepared by mixing an organic solvent with water. However, since water has a problem with storage stability and the ink is mostly composed of an organic solvent, strike-through may occur when the flow-out amount during writing is increased.

JP 2007-327003 A discloses a W/O type emulsion ink composition in which a pigment is added in an aqueous phase component in advance, followed by mixing with an oil-based component, whereby, water droplets composed of the aqueous phase component comprising the pigment dispersed therein are dispersed in the oil-based component. The publication discloses a ballpoint pen ink in which feel of writing has been improved by using this ink composition. However, the ballpoint pen ink lacks in stability, that is, water droplets are localized as a result of aggregation when stored over the long period. Because of a large amount of an oil-based component in the ink composition, strike-through and drawn line-drying property significantly may become inferior when the flow-out amount during writing is increased, like the water-based ballpoint pen.

The specification of JP 2009-292872 A by the present applicant discloses an ink composition for a water-based ballpoint pen, which has merits of a water-based ballpoint pen and an oil-based ballpoint pen, and also has ink properties in an oil-in-water type emulsion (0/W emulsion) form. This oil-in-water type emulsion ink composition for a water-based ballpoint pen is a new type of an ink composition for a water-based ballpoint pen and has excellent performance capable of achieving very smooth feel of writing. It has been found that, because of insufficient stability during storage at high temperature and storage at low temperature, the ink may cause phase separation when stored over the long period.

SUMMARY OF THE INVENTION

As mentioned above, the water-based ballpoint pen and the oil-based ballpoint pen have merits and demerits, respectively. An object of the present invention is to provide an oil-in-water type emulsion ink composition for a water-based ballpoint pen, having improved storage stability, which has both merits of both ballpoint pens and also does not cause phase separation even when stored at high or low temperature over the long period.

The present inventors have intensively studied and found that the addition of an ester of a condensed fatty acid oligomer (estolide) or a condensed fatty acid oligomer and an alcohol in an oil phase of an oil-in-water type emulsion ink eliminates temporal phase separation of the oil-in-water type emulsion ink, and thus providing satisfactory storage stability over the long term, leading to completion of the present invention.

The present invention is as described in detail below.

(1) An ink composition for a water-based ballpoint pen, comprising an aqueous phase, and an oil phase contained in the aqueous phase in a state of an oil-in-water type emulsion, wherein at least one of the oil phase and the aqueous phase comprises a colorant, and the oil phase comprises, in components composing the oil phase, an estolide which is a fatty acid oligomer in which fatty acids having a hydroxyl group are mutually condensed or a fatty acid having a hydroxyl group is condensed with a fatty acid having no hydroxyl group, or comprises an ester of the estolide and an alcohol.

(2) The ink composition for a water-based ballpoint pen according to (1), wherein the oxyfatty acid oligomer (estolide), or the ester of the estolide and the alcohol has a pour point of lower than 0° C. and −30° C. or higher.

(3) The ink composition for a water-based ballpoint pen according to (1) or (2), wherein an oil droplet of the oil-in-water type emulsion has an average particle diameter of 300 nm or less.

It is possible to provide an oil-in-water emulsion ink composition for a water-based ballpoint pen, having improved storage stability, which does not cause phase separation even when stored at high or low temperature over the long period.

DETAILED DESCRIPTION OF THE INVENTION

The present invention is directed to an ink composition for a water-based ballpoint pen, comprising an aqueous phase, and an oil phase contained in the aqueous phase in a state of an oil-in-water type emulsion, wherein at least one of the oil phase and the aqueous phase comprises a colorant, and the oil phase comprises, in components composing the oil phase, an estolide which is a fatty acid oligomer in which fatty acids having a hydroxyl group are mutually condensed or a fatty acid having a hydroxyl group is condensed with a fatty acid having no hydroxyl group, or comprises an ester of the estolide and an alcohol. Components of the ink composition of the present invention will be described in detail below.

The estolide used in the ink composition of the present invention is a fatty acid oligomer in which fatty acids having a hydroxyl group are mutually condensed or a fatty acid having a hydroxyl group is condensed with a fatty acid having no hydroxyl group.

It is possible to use, as the fatty acid having a hydroxyl group usable in the present invention, a conventionally used various fatty acids. A castor oil fatty acid comprising ricinoleic acid as a main component, or a hydrogenated castor oil fatty acid comprising 12-hydroxystearic acid as a main component is preferably used, and also a mixture thereof can be used.

Examples of the fatty acid having no hydroxyl group include capric acid, lauric acid, myristic acid, palmitic acid, stearic acid, arachic acid, behenic acid, lignoceric acid, cerotic acid, melissic acid, oleic acid, linoleic acid, linolenic acid and the like. It is also possible to use coconut oil fatty acid, palm oil fatty acid, olive oil fatty acid, beef tallow fatty acid, and hydrogenated beef tallow fatty acid, each comprising these components.

In the present invention, a fatty acid oligomer prepared by mutually condensing the above-mentioned fatty acids having a hydroxyl group, or a fatty acid oligomer (estolide) prepared by condensing a fatty acid having a hydroxyl group with a fatty acid having no hydroxyl group. As used herein, "fatty acid oligomer" refers to a condensate of a dimer or higher multimer. A condensate of any of a dimer to a heptamer is preferable. Although monomers may coexist in the fatty acid oligomer, the fatty acid oligomer is a condensate of 1.5-mer or higher multimer, and preferably 2.0-mer or higher multimer, on average of the entire fatty acid oligomer from the viewpoint of solubility in an oil phase.

Specific examples of the estolide usable in the present invention include estolides represented by the following structural formulas:

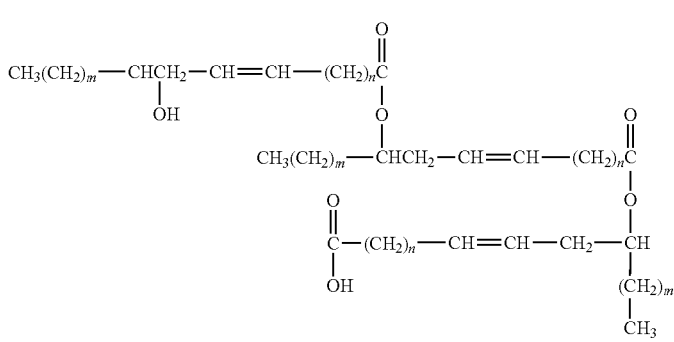

(1)

wherein m and n are integers,

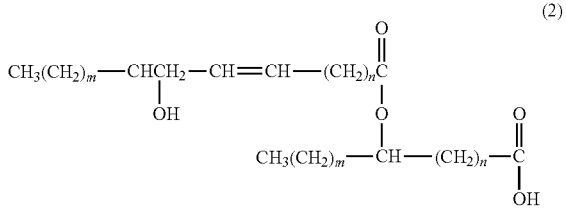

(2)

wherein m and n are integers, and

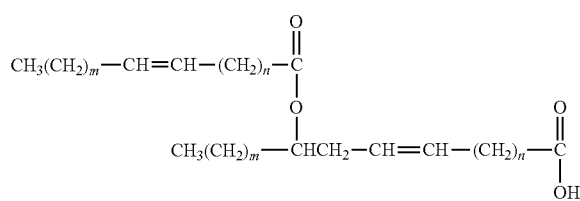

(3)

wherein m and n are integers.

It is also possible to use an ester of the above estolide and alcohol. It is possible to use, as an alcohol usable for esterification of the estolide, both a monohydric alcohol and a polyhydric alcohol. Both a synthetic alcohol and a natural alcohol can also be used.

A linear or branched alcohol having 1 to 30 carbon atoms can be preferably used as the monohydric alcohol. Specifically, isobutyl alcohol, 2-ethylhexyl alcohol, isostearyl alcohol, a synthetic alcohol having 4 or more carbon atoms or the like is preferably used. In view of solubility of an oil-in-water type emulsion in an oil phase, a branched alcohol is particularly preferable.

It is possible to preferably used, as the polyhydric alcohol, hindered alcohols such as neopentyl glycol, trimethylolpropane, pentaerythritol, ditrimethylolpropane, and dipentaerythritol; and polyglycols such as glycerol or derivatives thereof (for example, polyglycerol, etc.), sorbitan, sucrose, ethylene glycol, propylene glycol, and butylene glycol.

The pour point of the above-mentioned oxyfatty acid oligomer (estolide) or an ester of the estolide and an alcohol is preferably lower than 0° C. and −30° C. or higher. Use of the estolide or ester having a pour point of 0° C. or higher may impair storage stability at low temperature.

The neutralization number of the above-mentioned oxyfatty acid oligomer (estolide) or an ester of the estolide and an alcohol is preferably less than 100 mgKOH/g. Use of the estolide or ester having the neutralization number more than 100 mgKOH/g may impair storage stability at high temperature.

The estolide or an ester of the estolide and an alcohol can be added in the amount of 1 to 100% by mass, and preferably 3 to 100% by mass, in the oil phase component. When the amount is 1% by mass or less, it is hard to obtain the expected effect. The estolide or an ester of the estolide and an alcohol can account for 100% by mass in the oil phase component. This means that the oil phase is entirely composed of only an estolide or an ester of the estolide. When the oil phase comprises a dye as a colorant, the estolide or an ester of the estolide and an alcohol is contained in the amount of 1% by mass or more and less than 40% by mass, and preferably 3% by mass or more and less than 40% by mass, in the oil phase component. The amount of 1% by mass or less is not preferable since it is hard to obtain the expected effect, whereas, the amount of more than 40% by mass is not preferable since it is hard to dissolve the dye. Although inclusion of the dye in the oil phase may impair storage stability, the addition of the estolide or an ester of the estolide and an alcohol within the above range makes it possible to obtain the expected effect while maintaining solubility of the dye.

The oil phase of the ink composition of the present invention may comprise a colorant or not. In view of ensuring of the development of a vivid color of an ink and an improvement in density, the oil phase preferably comprises a dye. The oil phase may comprise a pigment as the colorant. In an aspect in which the oil phase comprises no colorant, the aqueous phase comprises a colorant.

The solvent (liquid component) composing the oil phase preferably comprises an aromatic organic solvent as the solvent of an oil-based solution. As mentioned above, when the oil phase is composed only of an estolide or an ester of the estolide, an organic solvent becomes unnecessary.

The aromatic organic solvent usable as the solvent of the oil-based solution is more preferably a solvent, which has one or more aromatic rings in the molecule and also has solubility in water of 5 g/100 g or less at 25° C., considering that the solvent can dissolve a dye and is incompatible with water, and also the thus formed emulsion has satisfactory storage stability and high safety. When solubility is more than 5 g/100 g, the obtained emulsion may become unstable to cause phase separation with the lapse of time.

The aromatic organic solvent usable in an oil-based solution of the present invention is preferably a comparatively low volatile solvent. Usable solvent can be one type of a solvent selected from the following examples of the solvent, or plural types of solvents.

Examples of the solvent usable in the oil-based solution of the present invention include benzyl alcohol, ethylene glycol monophenyl ether, ethylene glycol monobenzyl ether, propylene glycol monophenyl ether, diethylene glycol monophenyl ether, alkylsulfonic acid phenyl ester, butyl phthalate, ethylhexyl phthalate, tridecyl phthalate, ethylhexyl trimellitate, diethylene glycol dibenzoate, dipropylene glycol dibenzoate, xylene, toluene and the like. Among these solvents, particularly preferred solvents are ethylene glycol monobenzyl ether, propylene glycol monophenyl ether, alkylsulfonic acid phenyl ester, ethylhexyl phthalate, tridecyl phthalate, ethylhexyl trimellitate, diethylene glycol dibenzoate, dipropylene glycol dibenzoate, and a liquid xylene resin, each having a solubility in water at 25° C. of 1 g/100 g or less. Among these solvents, most preferred solvents are an alkylsulfonic acid phenyl ester, ethylhexyl trimellitate, diethylene glycol dibenzoate, dipropylene glycol dibenzoate, and a liquid xylene resin, each having a solubility in water at 25° C. of 0.1 g/100 g or less.

From the viewpoint of safety of an operation of dissolving a dye and the viewpoint of suppression of unstabilization due to an increase in inner pressure of an emulsion at high temperature, a solvent having a boiling point of 200° C. or higher is preferable. Examples of preferred solvent include benzyl alcohol, ethylene glycol monophenyl ether, ethylene glycol monobenzyl ether, propylene glycol monophenyl ether, diethylene glycol monophenyl ether, alkylsulfonic acid phenyl ester, butyl phthalate, ethylhexyl phthalate, tridecyl phthalate, ethylhexyl trimellitate, diethylene glycol dibenzoate, dipropylene glycol dibenzoate and the like.

The oil-based solution of the present invention can comprise, in addition to the above aromatic organic solvent, any cosolvent. For example, a solvent selected from alcohols, polyhydric alcohols, glycol ethers, hydrocarbons, and esters can be used. However, a solvent which is infinitely compatible with water should not be used in a large amount since it causes diffusion in an aqueous phase and aggregation of oil droplets. The amount may be within 10% by mass on a mass basis of the oil-based solution.

Alcohols are preferably aliphatic alcohols having 2 or more carbon atoms, and examples thereof include various higher alcohols such as ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methylamyl alcohol, 2-ethylbutanol, n-heptanol, 2-heptanol, 3-heptanol, n-octanol, 2-octanol, 2-ethylhexanol, 3,5,5'-trimethylhexanol, nonanol, n-decanol, undecanol, n-decanol, trimethylnonyl alcohol, tetradecanol, heptadecanol, cyclohexanol, 2-methylcyclohexanol and the like.

Polyhydric alcohols are preferably polyhydric alcohols having two or more carbon atoms and two or more hydroxyl groups in the molecule, and examples thereof include ethylene glycol, diethylene glycol, 3-methyl-1,3-butanediol, triethylene glycol, dipropylene glycol, 1,3-propanediol, 1,3-butanediol, 1,5-pentanediol, hexylene glycol, octylene glycol and the like.

Examples of glycol ethers include methyl isopropyl ether, ethyl ether, ethyl propyl ether, ethyl butyl ether, isopropyl ether, butyl ether, hexyl ether, 2-ethylhexyl ether, ethylene glycol monohexyl ether, ethylene glycol mono-2-ethyl butyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol tertiary butyl ether dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether, tetrapropylene glycol monobutyl ether and the like.

Examples of hydrocarbons include linear hydrocarbons such as hexane, isohexane, heptane, octane, nonane, and decane; and cyclic hydrocarbons such as cyclohexane, methylcyclohexane, and ethylcyclohexane.

Examples of a cosolvent of esters include various esters such as propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, isomethyl butyrate, isoethyl butyrate, isopropyl butyrate, methyl valerate, ethyl valerate, propyl valerate, isomethyl valerate, isoethyl valerate, isopropyl valerate, methyl trimethylacetate, trimethyl ethyl acetate, trimethyl propyl acetate, methyl caproate, ethyl caproate, propyl caproate, methyl caprylate, ethyl caprylate, propyl caprylate, methyl laurate, ethyl laurate, methyl oleate, ethyl oleate, caprylic acid triglyceride, citric acid tributyl acetate, octyl oxystearate, propylene glycol monoricinoleate, 2-hydroxyisomethyl butyrate, and 3-methoxybutyl acetate.

Diether or diester can be used as a cosolvent having no hydroxyl group in the molecule, and specific examples thereof include ethylene glycol diethyl ether, ethylene glycol dibutyl ether, diethylene glycol diethyl ether, diethylene glycol dibutyl ether, diethylene glycol dimethyl ether, dipropylene glycol dimethyl ether and the like.

When the oil phase of the ink composition of the present invention comprises a colorant, the colorant in the oil phase is at least a dye. As long as the usable dye is soluble in the above-mentioned solvent, any dye used in a common oil-based ink composition can be used. It is possible to use, as the oil-soluble dye of the present invention, any one from among direct dyes, acid dyes, basic dyes, mordant/acidic mordant dyes, spirit soluble dyes, azoic dyes, sulfur/sulfur vat dyes, vat dyes, disperse dyes, oil-soluble dyes, food dyes, metal complex dyes, salt-forming dyes, and dyes prepared by dyeing a resin with a dye, which are used in a conventional dye ink composition. Among these dyes, alcohol-soluble dyes soluble in an organic solvent, such as salt-forming dyes and oil-soluble dyes are preferable in view of solubility and stability of an emulsion. Dyes are particularly preferably oil-soluble dyes.

The amount of the lower limit of the dye is preferably 0.3% or more on a mass basis of the entire amount of the ink composition. The amount of less than 0.3% may cause insufficient tinting strength. The amount of the upper limit of the dye is preferably 70% or less on a mass basis of the entire amount of the ink composition. The amount of more than 70% may cause difficulty in dissolution of a dye, and thus the obtained ink composition is unsuited for use as an ink composition for a ballpoint pen. Particularly preferably, the amount of the dye is within a range from 1 to 6% on a mass basis of the ink composition and is also within a range from 10 to 60% on a mass basis of the oil-based solution.

Examples of salt-forming dyes usable in the present invention include VALIFAST COLOR (registered trademark, manufactured by Orient Chemical Industries Co., Ltd.), and AIZEN SPIRON dye and AIZEN SOT dye (registered trademark, manufactured by HODOGAYA CHEMICAL CO., LTD.).

Examples of dyes prepared by dyeing a resin with a dye include keiko-Colot MPI-500 Series, keiko-Colot MPI-500C Series and keiko-Colot NKS-1000 Series (registered trademark, manufactured by Nippon Keiko Kagaku Co., Ltd.).

It is possible to use, as the colorant in the oil phase, a small amount of a pigment in combination with a dye as long as stability of an emulsion can be maintained. When using the pigment, the amount of the pigment is preferably 10% or less on a mass basis of the oil-based solution. The amount more than 10% may cause a failure in stability of an emulsion.

Examples of pigments usable in combination with dyes in an oil phase include various organic pigments, for example, inorganic pigments such as carbon black and titanium oxide; phthalocyanine-based pigments, azo-based pigments, diketopyrrolopyrrole-based pigments, anthraquinone-based pigments, perylene-based pigments, isoindolinone-based pigments, quinacridone-based pigments and the like.

A resin can be used in the oil-based solution for preparing the ink composition of the present invention so as to adjust the viscosity. The viscosity of the oil-based solution is preferably from 500 to 1,000,000 mPa·s at 25° C. and a shear rate of 3.83/second in a state where no emulsifier is comprised. The viscosity of less than 500 mPa·s may cause writing unsmoothness, and thus it is hard to exhibit performance as an oil-based ink by preparing an oil-in-water type. It is not also preferred for stability of an emulsion. The viscosity of more than 1,000,000 mPa·s may cause unsmooth feel of writing, and the obtained ink composition is not preferable as an ink composition of a ballpoint pen. The viscosity is particularly preferably within a range from 3,000 to 500,000 mPa·s at 25° C. and a shear rate of 3.83/second.

Specific examples of resins usable in the ink composition of the present invention include natural and synthetic resins such as a ketone resin, a sulfoamide resin, a maleic acid resin, a terpene resin, a terpenephenol resin, an ester gum, a xylene resin, an alkyd resin, a phenol resin, rosin, polyvinylpyrrolidone, polyvinyl butyral, polyvinyl alcohol, an acrylic resin, a melamine-based resin, and a cellulose-based resin, and derivatives of these resins. These resins can be used alone, or two or more kinds of resins can be used in combination.

The amount of the dye and other additives in the oil-based solution is preferably from 3 to 70% on a mass basis of the entire oil-based solution in terms of the solid content. The solid content of less than 3% may fail to impart sufficient viscosity. The content of more than 70% may cause difficulty in dissolution of a dye, and thus the obtained ink composition is unsuited for use as an ink composition for a ballpoint pen. The solid content is particularly preferably within a range from 10% to 60%.

The aqueous phase of the ink composition of the present invention can be composed of a dispersion or aqueous solution in which at least a colorant has been dispersed or dissolved. In an aspect, the aqueous phase can be composed of a pigment dispersion in which a pigment has been dispersed in water. In another aspect, the aqueous phase can be composed of an aqueous solution in which a water-soluble dye has been dissolved in water in place of a pigment. A pigment and a dye can also be used in combination as the colorant of the aqueous phase. In another aspect, the aqueous phase of the present invention comprises no colorant.

When using a pigment as the colorant of the aqueous phase, for example, this pigment dispersion is a pigment dispersion using ion-exchange water or purified water. It is possible to use, as the pigment, inorganic pigments such as carbon black and titanium oxide; and various organic pigments such as phthalocyanine-based pigments, azo-based pigments, diketopyrrolopyrrole-based pigments, anthraquinone-based pigments, perylene-based pigments, isoindolinone-based pigments, and quinacridone-based pigments.

Examples of pigments include C.I. Pigment Blacks 1 and 7; C.I. Pigment Yellows 1, 2, 3, 12, 13, 14, 16, 17, 20, 24, 34, 35, 42, 53, 55, 65, 73, 74, 75, 81, 83, 86, 93, 94, 95, 97, 98, 99, 100, 101, 104, 108, 109, 110, 114, 117, 120, 125, 128, 129, 137, 138, 139, 147, 148, 150, 151, 153, 154, 155, 166, 167, 168, 173C, 174, 180, and 185; C.I. Pigment Reds 1, 2, 3, 5, 7, 8, 9, 10, 12, 16, 17, 19, 22, 38, 41, 43, 48, 48:2, 48:3, 49, 50:1, 52, 53, 53:1, 57, 57:1, 58:2, 60, 63:1, 63:2, 64:1, 86, 88, 90, 9, 112, 122, 123, 127, 146, 149, 166, 168, 170, 175, 176, 177, 179, 180, 181, 184, 185, 189, 190, 192, 194, 198, 202, 206, 207, 209, 215, 216, 217, 220, 223, 224, 226, 227, 228, 238, 240, 245, 254, and 225; C.I. Pigment Blues 1, 2, 3, 15:1, 15:2, 15:3, 15:4, 15:6, 16, 17, 22, 25, 60, 64, and 66; C.I. Pigment Oranges 5, 10, 13, 16, 36, 40, 43, 48, 49, 51, 55, 59, 61, and 71; C.I. Pigment Violets 1, 3, 5:1, 16, 19, 23, 29, 30, 31, 33, 36, 37, 38, 40, 42, and 50; C.I. Pigment Greens 7, 10, and 36; and C.I. Pigment Browns 23, 25, and 26.

The color of a pigment to be dispersed in an aqueous phase may be the same as or different from a color of a dye to be dissolved in an oil phase when the oil phase comprises the dye. When using a dye having the same color as that of the pigment, the color of the ink becomes vivid by a dye having the same color, and also the color density is improved. When using a dye having the color different from that of the pigment, the color of the obtained ink has a variety of tonings with high degree of freedom.

Examples of the dispersing agent for obtaining a pigment dispersion include, but are no limited to, various commercially available products. In view of affinity with the co-existing oil-in-water type emulsion and storage stability, a polymer resin-based dispersing agent is preferable, and a material different from that used in an emulsifier, which is used for formation of an emulsion, is preferable. For example, a styrene acrylic resin or a polyoxyethylene-based dispersing agent can be used. The dispersing agent is particularly preferably a styrene acrylic resin which is a polymer.

When using a pigment, the amount of the pigment to be used is from 2 to 15%, and preferably from 3 to 10%, based on the entire mass of the aqueous phase. When the amount of the pigment is 2% or less, light resistance as a main component of a colorant becomes inferior, and a drawn line is inferior in density. In contrast, the amount of the pigment of 15% or more is not preferred in view of dispersion stability of the pigment. The amount of the dispersing agent to be used preferably falls within a range from 20 to 100% based on the total mass of the pigment of the pigment dispersion.

It is possible to use, as the method for dispersing a pigment in an aqueous phase, a method in which the respective components are uniformly mixed by a mixing stirrer, or a method using a disperser such as a ball mill, a beads mill, a roll mill, a homomixer, a disper, an ultrasonic disperser, or a high pressure homogenizer.

The aqueous phase of the ink composition of the present invention can comprise, in addition to a pigment, a dye. Usable dye can be selected from dyes usable in the above-mentioned oil phase.

The aqueous phase can comprise additives for the purpose of preventing an ink from freezing at low temperature and preventing an ink from drying at a pen tip, and specific examples thereof include glycols such as ethylene glycol, diethylene glycol, triethylene glycol, propylene glycol, polyethylene glycol, 1,3-butylene glycol, thiodiethylene glycol, and glycerol; and ethers such as ethylene glycol monomethyl ether and diethylene glycol monomethyl ether. These additives can be used alone or in combination. The use amount of the additive is from 0 to 50%, and preferably from 0 to 30%, on a mass basis of the aqueous phase. The addition of 50% or more of the additive may cause stability problem in the obtained emulsion.

The aqueous phase comprises an emulsifier so as to form a stable emulsion by mixing with the above-mentioned oil-based solution. The emulsifier, which is mixed with a solvent of the oil-based solution of the present invention to form a stable emulsion over the long period, is an emulsifier having one or more aromatic rings in the molecular skeleton. It is considered that the emulsifier having one or more aromatic rings in the molecular skeleton forms a stable emulsion over the long period since the aromatic ring as a lipophilic group exhibits high affinity to a dye solution of an oil phase.

The aromatic emulsifier usable in the ink composition of the present invention is not particularly limited as long as it has one or more aromatic rings. It is possible for the emulsifier to usually properties thereof by the addition mole number of ethylene oxide (EO). In connection with a solvent used in the oil-based solution, the emulsifier is preferably an emulsifier in which the addition mole number of ethylene oxide is 40 mol or more. The reason is that aggregation of particles is suppressed by a long-chain ethylene oxide.

It is possible to use an emulsifier in which the above-mentioned addition mole number of ethylene oxide is 40 mol or more, in combination with an emulsifier exhibiting strong orientation to an oil phase in which the addition mole number of ethylene oxide is from 3 to 15 mol. The reason is considered that use of an emulsifier exhibiting strong orientation to an oil phase in combination with an emulsifier exhibiting strong orientation to an aqueous phase enables an increase in micelle concentration at an interface, leading to an increase in stability of an emulsion.

Regarding a hydrophile-lipophile balance value (HLB value), it is preferred to use, as the nonionic surfactant, one or more type of emulsifier having at least an HLB value of 15 or more are preferably used. The reason is that the emulsifier is excessively incorporated into the oil phase side when the HLB value is low, even in the case of large addition mole number of ethylene oxide.

Examples of the emulsifier comprising 40 mol or more of ethylene oxide include polycyclic phenyl type nonionic surfactants comprising 40 mol or more of ethylene oxide added therein, such as polyoxyethylene distyrenated phenyl ether, polyoxyethylene monostyrenated phenyl ether, and polyoxyethylene cumyl phenyl ether; and ionic surfactants such as sulfates thereof. The addition mole number of ethylene oxide is preferably 40 mol or more and 200 mol or less. In the case of an emulsifier comprising 200 mol or more of ethylene oxide added therein, viscosity may significantly increase, and thus being unsuitable for use.

Examples of the emulsifier in which the addition mole number of ethylene oxide is from 3 to 15 include polycyclic phenyl type nonionic surfactants comprising 3 to 15 mol of ethylene oxide chain added therein, such as polyoxyethylene distyrenated phenyl ether, polyoxyethylene monostyrenated phenyl ether, and polyoxyethylene cumyl phenyl ether; ionic surfactants such as sulfates thereof; and alkylphenol type nonionic surfactants such as polyoxyethylene alkyl phenyl ether.

In addition to the emulsifier having aromatic rings in the molecule, any emulsifier having the other structure can be added. Examples thereof include linear hydrocarbon type nonionic surfactants such as polyoxyethylene hardened castor oil and polyoxyethylene alkyl (C10-C18) ester; and sorbitan derivatives. The amount of the emulsifier is preferably from 5 to 150%, and most preferably from 10 to 100%, on a mass basis of the oil-based solution.

The aqueous phase can comprise, in addition to emulsifiers, various additives used commonly in a water-based ballpoint pen, for example, rust-preventive agents, antiseptics, pH adjustors, lubricants, humectants, and thickeners such as resins and natural polysaccharides.

The proportion of the oil phase component is from 1 to 20%, and preferably from 5 to 15%, on a mass basis in the oil-in-water type ink composition for a water-based ballpoint pen of the present invention. When the proportion of the oil phase component is less than 1%, neither improvement in color density nor satisfactory writing performance is obtained, and thus the obtained ballpoint pen is still not different from a conventional water-based ballpoint pen. In contrast, when the proportion of the oil phase component is more than 20%, an emulsion may be unstabilized by an interaction with a pigment dispersion. Since the oil content increases, an adverse influence may be exerted on drawn line-drying property.

The average particle diameter of the emulsion is preferably 300 nm or less, and more preferably 150 nm or less. The average particle diameter is adjusted to 300 nm or less so as to suppress sedimentation of particles or aggregation due to mutual collision of particles. The particle diameter can be controlled by the below-mentioned emulsification method, and also can be decreased by a mechanical shear force using an emulsifying device such as a high pressure homogenizer.

It is possible to use, as the emulsification method of an oil-in-water type emulsion of the present invention, various emulsification methods known in the prior art, such as a phase inversion emulsification method, a D (Detergent) phase emulsification method, a PIT (Phase Inversion Temperature) emulsification method, and a mechanical emulsification method. In the phase inversion emulsification method, the oil-in-water type emulsion of the present invention is produced by the following steps:
(a) the step of stirring an oil-based solution component comprising a dye as a colorant in an organic solvent to dissolve a solid component;
(b) the step of adding an emulsifier to an aqueous phase component, followed by stirring to dissolve the emulsifier;
(c) the step of adding a pigment and, if necessary, a dispersing agent to the aqueous phase component, and dispersing the pigment;
(d) the step of gradually adding the aqueous phase component obtained in the steps b and c while stirring the oil-based solution obtained in the step a to obtain a water-in-oil type emulsion; and
(e) the step of further adding an aqueous phase component while stirring, followed by phase transfer to obtain an oil-in-water type emulsion.

A conventionally known method in the production of a water-based pigment ink can be employed in the step of preparing an aqueous phase comprising a pigment dispersion. The method includes, for example:
(a) the step of stirring a pigment, a dispersing agent, a solvent, and a pH adjustor for 3 hours using a stirrer;
(b) the step of dispersing for 5 hours using a sand mill;
(c) the step of removing coarse particles of the above pigment dispersion using a centrifugal separator; and
(d) the step of diluting the above pigment dispersion and adding other components.

The thus prepared oil-in-water type emulsion and aqueous phase comprising a pigment dispersion are mixed with stirring. It is possible to use, in the mixing with stirring, a method in which the respective components are uniformly mixed by a mixing stirrer, or a method in which the respective components are mixed with dispersing using a disperser such as a ball mill, a beads mill, a roll mill, a homomixer, a disper, an ultrasonic disperser, or a high pressure homogenizer. At this time, an oil phase component and an aqueous phase component may be simultaneously mixed with stirring or dispersing, and the respective components may be sequentially mixed with stirring or dispersing.

While the aqueous phase comprising a pigment dispersion was exemplified, a colorant comprised in the aqueous phase is not limited to a pigment, and the aqueous phase may comprise no colorant and the colorant may be blended only in the oil phase.

While a pigment dispersion prepared in advance may be used as an aqueous phase component in the case of producing an oil-in-water type emulsion, it is preferred that the oil-in-water type emulsion production step and the pigment dispersion step are separately performed since an adverse influence would be exerted on a pigment dispersion system in the case of phase transfer by phase inversion emulsification.

The viscosity of the ink composition of the present invention for a water-based ballpoint pen is preferably from 1 to 100 mPa·s, and more preferably from 5 to 50 mPa·s, in terms of a viscosity at 25° C. and a shear rate of 380/second. The viscosity of 100 mPa·s or more is not preferred since ink followability in an ink refill may deteriorate as a result of an increase in viscosity of the ink.

EXAMPLES

Preferred aspects and excellent effects thereof of the present invention will be specifically described below by way of most typical Inventive Examples. In the following Examples, all percentages are by mass.

In Inventive Examples 1 to 13, ink compositions were prepared by changing a condensed fatty acid (estolide) or a condensed fatty acid (estolide) ester to be mixed, respectively. First, oil phase components shown in Table 1 were warmed to a temperature of 50° C. to 60° C. while stirring to obtain oil-based solutions comprising these components dissolved completely therein. The values in Table 1 are values (% by mass) of the respective components assuming that the total amount of the oil-based solution is regarded as 100.

A pour point in Table 1 was measured in accordance with the procedure defined in JIS K2269. After weighing 45 mL of a sample in a predetermined glass test tube, a thermometer was disposed at a predetermined position and the sample was cooled by a cooling bath (−34.5° C.). The test tube was taken out from the cooling bath every time when the sample temperature decreases by 2.5° C. After reading the temperature at which the sample stops moving completely for 5 seconds, 2.5° C. was added to this temperature to obtain the pour point.

A neutralization number in Table 1 was measured in accordance with the procedure defined in JIS K2501. In a predetermined glass container, 50 ml of a sample was weighed and dissolved in a solvent (toluene/2-propanol/water (5/5/0.05 in a volume ratio)) and then the neutralization number was calculated by neutralization titration using a potentiometric titration method.

TABLE 1

Oil phase component (% by mass) (Examples (Inventive Examples)

| Components | | Power point (C°) | Neutralization number (mgKOH/g) | | Example 1 | Example 2 | Example 3 | Example 4 | Example 5 | Example 6 | Example 7 |
|---|---|---|---|---|---|---|---|---|---|---|---|
| PhFG | Propylene glycol monophenyl ether | | | Manufactured by Nippon Nyukazai Co., Ltd. | 20 | 20 | 20 | 20 | 20 | 20 | 20 |
| JP-120 | Dipropylene glycol dibenzoate | | | Manufactured by J-PLUS Co., Ltd. | 40 | 40 | 40 | 40 | | 40 | 40 |
| EHG | 2-Ethylhexyl glycol | | | Manufactured by Nippon Nyukazai Co., Ltd. | | | | | 60 | | |
| RC-55 | Condensed fatty acid | −30.0 | 51-59 | Manufactured by ITOH OIL CHEMICALS CO., LTD. | 10 | 5 | 20 | 10 | 10 | 10 | |
| RC-17 | Condensed fatty acid | 0 | 85-95 | Manufactured by ITOH OIL CHEMICALS CO., LTD. | | | | | | | 10 |
| RC-2 | Condensed fatty acid | −27.5 | 105-115 | Manufactured by ITOH OIL CHEMICALS CO., LTD. | | | | | | | |

| Components | | Power point (C°) | Neutralization number (mgKOH/g) | | Example 8 | Example 9 | Example 10 | Example 11 | Example 12 | Example 13 |
|---|---|---|---|---|---|---|---|---|---|---|
| PhFG | Propylene glycol Monophenyl ether | | | Manufactured by Nippon Nyukazai Co., Ltd. | 20 | 20 | 20 | 20 | 10 | |
| JP-120 | Dipropylene glycol dibenzoate | | | Manufactured by J-PLUS Co., Ltd. | 40 | 40 | 40 | 40 | 20 | |
| EHG | 2-Ethylhexyl glycol | | | Manufactured by Nippon Nyukazai Co., Ltd. | | | | | | |
| RC-55 | Condensed fatty acid | −30.0 | 51-59 | Manufactured by ITOH OIL CHEMICALS CO., LTD. | | | | 40 | 70 | 100 |
| RC-17 | Condensed fatty acid | 0 | 85-95 | Manufactured by ITOH OIL CHEMICALS CO., LTD. | | | | | | |
| RC-2 | Condensed fatty acid | −27.5 | 105-115 | Manufactured by ITOH OIL CHEMICALS CO., LTD. | 10 | | | | | |

| Components | | Power point (C°) | Neutralization number (mgKOH/g) | | Example 1 | Example 2 | Example 3 | Example 4 | Example 5 | Example 6 | Example 7 |
|---|---|---|---|---|---|---|---|---|---|---|---|
| LB-601 | Condensed fatty acid ester | −25.0 | 10-15 | Manufactured by ITOH OIL CHEMICALS CO., LTD. | | | | | | | |
| L3-702 | Condensed fatty acid ester | −10.0 | ≤5.0 | Manufactured by ITOH OIL CHEMICALS CO., LTD. | | | | | | | |
| 12 Hydroxy-stearic acid | Fatty acid (Monomer) | | | Manufactured by ITOH OIL CHEMICALS CO., LTD. | | | | | | | |
| CO-FA methyl ester | Fatty acid ester (Monomer) | | | Manufactured by ITOH OIL CHEMICALS CO., LTD. | | | | | | | |

TABLE 1-continued

| | | | | Oil phase component (% by mass) (Examples (Inventive Examples)) | | | | | | |
|---|---|---|---|---|---|---|---|---|---|---|
| Oil Black. No. 5 | Oil-soluble dye | | Manufactured by Orient Chemical Industries Co., Ltd. | 30 | 35 | 20 | 30 | 30 | 30 | 30 |

| Components | | Power point (C°) | Neutralization number (mgKOH/g) | | Example 8 | Example 9 | Example 10 | Example 11 | Example 12 | Example 13 |
|---|---|---|---|---|---|---|---|---|---|---|
| LB-601 | Condensed fatty acid ester | −25.0 | 10-15 | Manufactured by ITOH OIL CHEMICALS CO., LTD. | | 10 | | | | |
| LB-702 | Condensed fatty acid ester | −10.0 | ≤5.0 | Manufactured by ITOH OIL CHEMICALS CO., LTD. | | | 10 | | | |
| 12 Hydroxy-stearic acid | Fatty acid (Monomer) | | | Manufactured by ITOH OIL CHEMICALS CO., LTD. | | | | | | |
| CO-FA methyl ester | Fatty acid ester (Monomer) | | | Manufactured by ITOH OIL CHEMICALS CO., LTD. | | | | | | |
| Oil Black No. 5 | Oil-soluble dye | | | Manufactured by Orient Chemical Industries Co., Ltd. | 30 | 30 | 30 | | | |

Separately, a surfactant was dissolved in purified water to prepare an emulsifier solution. Then, the emulsifier solution was gradually added to the oil-based solution while stirring thereby causing phase inversion from a water-in-oil type (w/o) emulsion to an oil-in-water type (o/w) emulsion, and thus obtaining an oil-in-water type emulsion.

In Examples other than Example 4, a three pass treatment was performed while cooling to 20° C. using a high pressure homogenizer to obtain a refined emulsion. In Example 4, stirring was performed for 15 minutes by a homogenizer.

Thereafter, a pigment dispersion comprising carbon black (pigment), a styrene acrylic resin (dispersing agent), ethylene glycol and water was added to the oil-in-water type emulsion, followed by the addition of an additive component comprising a lubricant, triethanolamine and water to obtain an ink composition of the present invention. The emulsifier solution, the pigment dispersion component and the additive component used are shown in detail in Table 2. The ink composition was prepared at a mixing ratio of the oil phase component to the aqueous phase component "oil phase component:aqueous phase component=10:90 (the oil phase component accounts for 10% of the ink)".

TABLE 2

| | | | Aqueous phase component (% by mass) (Examples (Inventive Examples)) | | | | | | | |
|---|---|---|---|---|---|---|---|---|---|---|
| Components | | | | Example 1 | Example 2 | Example 3 | Example 4 | Example 5 | Example 6 | Example 7 |
| Emulsifier solution | Newcol N780 | Polyoxyethylene styrenated phenyl ether | Manufactured by Nippon Nyukazai Co., Ltd. | 6.7 | 6.7 | 6.7 | 6.7 | 6.7 | | 6.7 |
| | Newcol 2360 | Polyoxyethylene alkyl ether | Manufactured by Nippon Nyukazai Co., Ltd. | | | | | | 6.7 | |
| | Water | | | 26.7 | 26.7 | 26.7 | 26.7 | 26.7 | 26.7 | 26.7 |
| Pigment dispersion | MCF88 | Carbon black | | 6.7 | 6.7 | 6.7 | 6.7 | 6.7 | 6.7 | 6.7 |
| | JONCRYL61J | Styrene acrylic resin | Manufactured by BASF Corporation | 1.3 | 1.3 | 1.3 | 1.3 | 1.3 | 1.3 | 1.3 |
| | Ethylene glycol | | | 2.2 | 2.2 | 2.2 | 2.2 | 2.2 | 2.2 | 2.2 |
| | Water | | | 34.2 | 34.2 | 34.2 | 34.2 | 34.2 | 34.2 | 34.2 |
| Additive component | RB-410 | Phosphoric acid ester | Manufactured by TOHO Chemical Industry Co., Ltd. | 0.6 | 0.6 | 0.6 | 0.6 | 0.6 | 0.6 | 0.6 |
| | Triethanolamine | Triethanolamine | | 0.6 | 0.6 | 0.6 | 0.6 | 0.6 | 0.6 | 0.6 |
| | Water | | | 21 | 21 | 21 | 21 | 21 | 21 | 21 |

TABLE 2-continued

| | | | Example 8 | Example 9 | Example 10 | Example 11 | Example 12 | Example 13 |
|---|---|---|---|---|---|---|---|---|
| Aqueous phase component (% by mass) (Examples (Inventive Examples)) | | | | | | | | |
| Components | | | | | | | | |
| Emulsifier solution | Newcol N780 | Polyoxyethylene styrenated phenyl ether, Manufactured by Nippon Nyukazai Co., Ltd. | 6.7 | 6.7 | 6.7 | 6.7 | 6.7 | 6.7 |
| | Newcol 2360 | Polyoxyethylene alkyl ether, Manufactured by Nippon Nyukazai Co., Ltd. | | | | | | |
| | Water | | 26.7 | 26.7 | 26.7 | 26.7 | 26.7 | 26.7 |
| Pigment dispersion | MCF88 | Carbon black | 6.7 | 6.7 | 6.7 | 6.7 | 6.7 | 6.7 |
| | JONCRYL61J | Styrene acrylic resin, Manufactured by BASF Corporation | 1.3 | 1.3 | 1.3 | 1.3 | 1.3 | 1.3 |
| | | Ethylene glycol | 2.2 | 2.2 | 2.2 | 2.2 | 2.2 | 2.2 |
| | Water | | 34.2 | 34.2 | 34.2 | 34.2 | 34.2 | 34.2 |
| Additive component | RB-410 | Phosphoric acid ester, Manufactured by TOHO Chemical Industry Co., Ltd. | 0.6 | 0.6 | 0.6 | 0.6 | 0.6 | 0.6 |
| | Triethanolamine | Triethanolamine | 0.6 | 0.6 | 0.6 | 0.6 | 0.6 | 0.6 |
| | Water | | 21 | 21 | 21 | 21 | 21 | 21 |

Using the respective ink compositions and ink followers obtained in Inventive Examples 1 to 13, water-based ballpoint pens were produced. Specifically, using an axis of a ballpoint pen [manufactured by MITSUBISHI PENCIL CO., LTD. under the trade name of Signo UM-100], a refill comprising an ink-containing tube made of polypropylene, having an inner diameter of 3.8 mm and a length of 113 mm, a tip made of stainless steel (cemented carbide ball having a ball diameter of 0.38 mm) and a joint connecting the ink-containing tube to the tip was filled with the above ink composition, and an ink follower was applied at the rear end of the ink to produce a ballpoint pen, and then the following evaluation test was performed.

An oil phase component shown in Table 3 and an aqueous phase component shown in Table 4 were prepared as Comparative Examples 1 to 3 and then an ink composition was obtained by the same operation as in the above respective Examples. Comparative Example 1 is identical to Example 1, except that a fatty acid (12 hydroxystearic acid) was used alone without using a condensed fatty acid. Comparative Example 2 is identical to Example 1, except that a fatty acid ester (CO-FA methyl ester) was used alone without using a condensed fatty acid ester. Comparative Example 3 is an example in which neither a condensed fatty acid nor a condensed fatty acid ester was used. In the same manner as in Inventive Examples, a ballpoint pen was produced and the following evaluation test was performed.

TABLE 3

| | | Comparative Example 1 | Comparative Example 2 | Comparative Example 3 |
|---|---|---|---|---|
| Oil phase component (% by mass) (Comparative Examples) | | | | |
| Components | | | | |
| PhFG | Propylene glycol monophenyl ether, manufactured by Nippon Nyukazai Co., Ltd. | 20 | 20 | 25 |
| JP-120 | Dipropylene glycol dibenzoate, manufactured by J-PLUS Co., Ltd. | 40 | 40 | 45 |
| EHG | 2-Ethylhexyl glycol, manufactured by Nippon Nyukazai Co., Ltd. | | | |
| RC-55 | Condensed fatty acid, manufactured by ITOH OIL CHEMICALS CO., LTD. | | | |
| RC-21 | Condensed fatty acid, manufactured by ITOH OIL CHEMICALS CO., LTD. | | | |
| LB-601 | Condensed fatty acid ester, manufactured by ITOH OIL CHEMICALS CO., LTD. | | | |
| LB-604 | Condensed fatty acid ester, manufactured by ITOH OIL CHEMICALS CO., LTD. | | | |
| LB-702 | Condensed fatty acid ester, manufactured by ITOH OIL CHEMICALS CO., LTD. | | | |
| 12 Hydroxystearic acid | Fatty acid (Monomer), manufactured by ITOH OIL CHEMICALS CO., LTD. | 10 | | |
| CO-FA methyl ester | Fatty acid ester (Monomer), manufactured by ITOH OIL CHEMICALS CO., LTD. | | 10 | |
| Oil Black No. 5 | Oil-soluble dye, manufactured by Orient Chemical Industries Co., Ltd. | 30 | 30 | 30 |

TABLE 4

| | | | | Comparative Example 1 | Comparative Example 2 | Comparative Example 3 |
|---|---|---|---|---|---|---|
| Components | | | | | | |
| Emulsifier solution | Newcol N780 | Polyoxyethylene styrenated phenyl ether | Manufactured by Nippon Nyukazai Co., Ltd. | 6.7 | 6.7 | 6.7 |
| | Newcol 2360 | Polyoxyethylene alkyl ether | Manufactured by Nippon Nyukazai Co., Ltd. | | | |
| | Water | | | 26.7 | 26.7 | 26.7 |
| Pigment dispersion | MCF88 | Carbon black | | 6.7 | 6.7 | 6.7 |
| | JONCRYL61J | Styrene acrylic resin | Manufactured by BASF Corporation | 1.3 | 1.3 | 1.3 |
| | | Ethylene glycol | | 2.2 | 2.2 | 2.2 |
| | Water | | | 34.2 | 34.2 | 34.2 |
| Additive component | RB-410 | Phosphoric acid ester | Manufactured by TOHO Chemical Industry Co., Ltd. | 0.6 | 0.6 | 0.6 |
| | Triethanolamine | Triethanolamine | | 0.6 | 0.6 | 0.6 |
| | Water | | | 21 | 21 | 21 |

<Evaluation>
(a) Ink Viscosity

In the measurement of a viscosity of an ink, a rheometer RheoStress 600 manufactured by HAAKE Manufacturing Company, Inc. was used. A cone having a diameter of 20 mm and an inclination angle of 1 degree was used. The measurement was performed under the conditions at 25° C. and a shear rate of 380/second for 30 seconds, and the obtained stable numerical value was employed as the viscosity.

(b) Average Particle Diameter of Emulsion

An average particle diameter of an emulsion was measured using a particle size analyzer N4Plus (manufactured by COULTER Corporation). In the measurement, a sample was diluted until the density reaches a recommended density of N4Plus, and then the measurement was performed under the temperature condition at 25° C. The term of the average particle diameter used in the present specification refers to a median diameter.

(c) High Temperature Stability

In an acceleration test for evaluation of high temperature stability, a pen body obtained as mentioned above was left to stand under the environment at 60° C. and humidity 0% for a month, and a writing performance was confirmed.

A: There is no change from an initial state.
B: Although slight change is observed as compared with an initial state, there is nothing wrong with writing.
C: Separation of ink occurs and deterioration of a drawn line is observed.

(d) Low Temperature Stability

In an acceleration test for evaluation of low temperature stability, a pen body obtained as mentioned above was left to stand under the condition at −20° C. for 3 days to freeze an ink inside the pen body. After melting the ink by being left to stand at room temperature for a day, writing performance was confirmed.

A: There is no change from an initial state.
B: Although slight change is observed as compared with an initial state, there is nothing wrong with writing.
C: Separation of ink occurs and deterioration of a drawn line is observed.

The results are shown in Table 5. As is apparent from the results shown in Table 5, all inks comprising an estolide or an ester of the estolide and an alcohol of Inventive Examples 1 to 13, which fall under the scope of the present invention, exhibited desired stability at both high temperature and low temperature. All inks comprising fatty acid or a fatty acid ester of a monomer added therein of Comparative Examples 1 and 2 were inferior in low temperature stability.

TABLE 5

| Evaluations | Example 1 | Example 2 | Example 3 | Example 4 | Example 5 | Example 6 | Example 7 | Example 8 |
|---|---|---|---|---|---|---|---|---|
| Ink viscosity (mPa·s/380 s$^{-1}$) | 15.2 | 13.2 | 16.3 | 13.0 | 15.2 | 15.6 | 14.6 | 13.1 |
| Average particle diameter of emulsion (nm) | 150 | 190 | 130 | 310 | 140 | 150 | 140 | 180 |
| High temperature stability | A | A | A | B | A | B | A | B |
| Low temperature stability | A | A | A | B | B | A | B | A |

| Evaluations | Example 9 | Example 10 | Example 11 | Example 12 | Example 13 | Comparative Example 1 | Comparative Example 2 | Comparative Example 3 |
|---|---|---|---|---|---|---|---|---|
| Ink viscosity (mPa·s/380 s$^{-1}$) | 16.5 | 12.9 | 13.4 | 12.4 | 11.2 | 14.9 | 15.0 | 15.3 |
| Average particle diameter of emulsion (nm) | 160 | 170 | 130 | 120 | 110 | 150 | 150 | 190 |
| High temperature stability | A | A | A | A | A | B | B | C |
| Low temperature stability | A | A | A | A | A | C | C | B |

What is claimed is:

1. An ink composition for a water-based ballpoint pen, comprising:
   an aqueous phase, and an oil phase contained in the aqueous phase in a state of an oil-in-water emulsion, wherein:
   at least one of the oil phase and the aqueous phase comprises a colorant, and
   the oil phase comprises, in components composing the oil phase, an estolide which is a fatty acid oligomer in which fatty acids having a hydroxyl group are mutually condensed or a fatty acid having a hydroxyl group is condensed with a fatty acid having no hydroxyl group, or comprises an ester of the estolide and an alcohol.

2. The ink composition for a water-based ballpoint pen according to claim 1, wherein:
   the oxyfatty acid oligomer (estolide), or the ester of the estolide and the alcohol has a pour point of lower than 0° C. and −30° C. or higher.

3. The ink composition for a water-based ballpoint pen, according to claim 1, wherein:
   an oil droplet of the oil-in-water emulsion has an average particle diameter of 300 nm or less.

4. The ink composition for a water-based ballpoint pen, according to claim 2, wherein:
   an oil droplet of the oil-in-water emulsion has an average particle diameter of 300 nm or less.

* * * * *